US00RE40118E

(19) United States
(12) Reissued Patent
Watanabe et al.

(10) Patent Number: US RE40,118 E
(45) Date of Reissued Patent: Feb. 26, 2008

(54) MULTI-PIECE SOLID GOLF BALL

(75) Inventors: Hideo Watanabe, Chichibu (JP); Yasumasa Shimizu, Chichibu (JP); Akira Kimura, Chichibu (JP)

(73) Assignee: Bridgestone Corporation, Tokyo (JP)

(21) Appl. No.: 10/788,045

(22) Filed: Feb. 27, 2004

Related U.S. Patent Documents

Reissue of:
(64) Patent No.: 6,561,925
Issued: May 13, 2003
Appl. No.: 09/776,663
Filed: Feb. 6, 2001

(30) Foreign Application Priority Data

Feb. 8, 2000 (JP) ..... 2000-030190

(51) Int. Cl.
*A63B 37/04* (2006.01)
*A63B 37/06* (2006.01)

(52) U.S. Cl. ..... 473/371; 473/367; 473/368; 473/370; 473/372; 473/373; 473/374; 473/376; 473/377

(58) Field of Classification Search ..... 473/351–377
See application file for complete search history.

(56) References Cited

U.S. PATENT DOCUMENTS 5,184,828 A * 2/1993 Kim et al. ..... 473/374
5,403,010 A * 4/1995 Yabuki et al. ..... 473/372
5,439,227 A * 8/1995 Egashira et al. ..... 473/373
5,556,098 A * 9/1996 Higuchi et al. ..... 473/373
5,645,496 A * 7/1997 Endo et al. ..... 473/372
5,704,854 A * 1/1998 Higuchi et al. ..... 473/373
5,830,086 A * 11/1998 Hayashi et al. ..... 473/376
6,129,640 A * 10/2000 Higuchi et al. ..... 473/374
6,213,896 B1 * 4/2001 Higuchi et al. ..... 473/374
6,267,694 B1 * 7/2001 Higuchi et al. ..... 473/374
6,277,036 B1 * 8/2001 Hayashi et al. ..... 473/376
6,431,998 B1 * 8/2002 Nakamura et al. ..... 473/371
6,465,573 B1 * 10/2002 Maruko et al. ..... 525/130

FOREIGN PATENT DOCUMENTS

JP 11253578 A * 9/1999

OTHER PUBLICATIONS

M.R. Farrally et al., Science and Golf III: Proceedings of the World Scientific Congress of Golf, Illinois: Human Kinetics, copy right 1999, p. 411.*

* cited by examiner

*Primary Examiner*—Eugene Kim
*Assistant Examiner*—Alvin A Hunter
(74) *Attorney, Agent, or Firm*—Sughrue Mion, PLLC

(57) ABSTRACT

A multi-piece solid golf ball includes a solid core, at least one intermediate layer, and a cover having at least one cover layer. The solid core has a compression deflection of 3.0 mm or more, the intermediate layer is mainly made from a thermoplastic resin and has a Shore D hardness of 45 to 55 and a specific gravity of 1.2 or less, and the cover has a Shore D hardness of 60 or more and a thickness of 1.6 to 2.3 mm. The golf ball further comprises a ratio of the compression deflection of a sphere composed of the solid core covered with the intermediate layer to the compression deflection of the solid core is more than 0.900 and less than 0.970; and a difference in JIS-C hardness between the surface and the center of the solid core is equal to or less than 5.

5 Claims, 1 Drawing Sheet

MULTI-PIECE SOLID GOLF BALL

Matter enclosed in heavy brackets [ ] appears in the original patent but forms no part of this reissue specification; matter printed in italics indicates the additions made by reissue.

BACKGROUND OF THE INVENTION

The present invention relates to a multi-piece solid golf ball having at least three layers, more specifically, a solid core, at least intermediate layer, and a cover having at least one cover layer, and particularly to a multi-piece solid golf ball which is capable of giving a player a desirable soft feeling of hitting the golf ball upon putter shot or approach shot and also a desirable feeling of hitting the golf ball upon driver shot, and which is capable of improving the flying performance of the golf ball.

Solid golf balls have been variously improved. For example, an attempt has been made to soften the hardness of a cover of a two-piece golf ball for giving a player a desirable feeling of hitting the golf ball.

In the case of the above two-piece golf ball, however, if the hardness of the cover is softened, there arises a new problem that the flying distance of the golf ball is shortened.

On the other hand, it has been known that the flying performance of a golf ball can be improved by increasing the hardness of a cover of the golf ball; however, in this case, there arises another problem that the player's feeling of hitting the golf ball upon putter shot or approach shot is degraded.

In this way, it has been difficult to obtain a solid golf ball capable of giving a player a desirable feeling of hitting the golf ball as well as improving the flying performance of the golf ball.

SUMMARY OF THE INVENTION

An object of the present invention is to provide a multi-piece solid golf ball which is capable of giving a player a desirable feeling of hitting the golf ball upon putter shot or approach shot and also a desirable feeling of hitting the golf ball upon driver shot, and which is capable of improving the flying performance of the golf ball.

To achieve the above object, the present inventor has made studies on a multi-piece solid golf ball including at least one intermediate layer between a solid core and a cover.

Eventually, the present inventor has found that a multi-piece solid golf ball characterized in that the solid core has a compression deflection of 3.0 mm or more when a load range of initial 10 kgf to final 130 kgf is applied, the intermediate layer is mainly made from a thermoplastic resin and has a Shore D hardness (ASTM D-2240-75) of 45 to 55 and a specific gravity of 1.2 or less, and the cover has a Shore D hardness of 60 or more and a thickness of 1.6 to 2.3 mm; a ratio of the compression deflection of a sphere composed of the intermediate layer and the solid core covered therewith to the compression deflection of the solid core is more than 0.900 and less than 0.970 [0.900< (compression deflection of sphere/compression deflection of solid core)<0.970]; and a difference in JIS-C hardness (specified under JIS K6301-1996) between the surface and the center of the solid core is equal to or [less] *greater* than 5 [5≦(surface hardness-center hardness)], is advantageous in that the hardness distribution of the solid core, the intermediate layer, and the cover are optimized by specifying the difference in hardness between the surface and the center of the solid core and by increasing the repulsion characteristic of the intermediate layer and increasing the hardness of the cover, with a result that such a golf ball is capable of giving a player a desirable soft feeling of hitting the golf ball upon putter shot or approach shot and also a desirable feeling of hitting the golf ball upon driver shot, and is capable of improving the flying performance of the golf ball to such an extent as to satisfy a player of an average class with a head speed of 40 m/s or less.

Accordingly, the present invention provides a multi-piece solid golf ball comprising: a solid core; at least one intermediate layer for covering the solid core; and a cover having at least one cover layer for covering the intermediate layer; wherein the solid core has a compression deflection of 3.0 mm or more when a load range of initial 10 kgf to final 130 kgf is applied, the intermediate layer is mainly made from a thermoplastic resin and has a Shore D hardness of 45 to 55 and a specific gravity of 1.2 or less, and the cover has a Shore D hardness of 60 or more and a thickness of 1.6 to 2.3 mm; a ratio of the compression deflection of a sphere composed of the intermediate layer and the solid core covered therewith to the compression deflection of the solid core is more than 0.900 and less than 0.970 [0.900< (compression deflection of sphere/compression deflection of solid core)<0.970]; and a difference in JIS-C hardness (specified under JIS K6301-1996) between the surface and the center of the solid core is equal to or [less] *greater* than 5 [5≦(surface hardness-center hardness)].

DETAILED DESCRIPTION OF THE PREFERRED EMBODIMENTS

Figure 1:
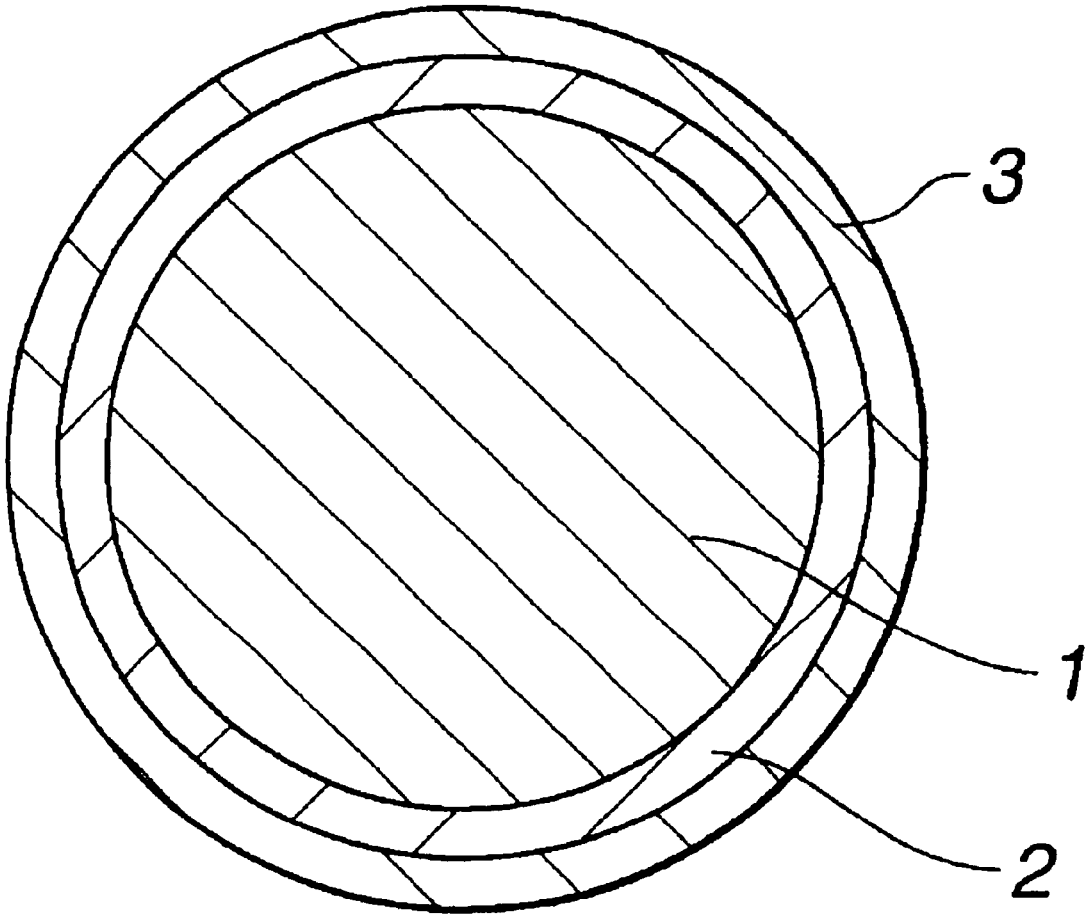
FIG. 1 is a sectional view showing one embodiment of a multi-piece solid golf ball of the present invention.

The present invention will be described in detail with reference to the accompanying drawing.

Referring to FIG. 1, there is shown a golf ball having at least three layers according to the present invention, which has a solid core 1, an intermediate layer 2 for covering the solid core 1, and a cover 3 for covering the intermediate layer 2. Each of the solid core, intermediate layer, and cover of the golf ball shown in the FIGURE is of a single layer structure; however, it may be of a multi-layer structure having two or more layers as needed. When the solid core, intermediate layer, or cover, each has a plurality of layers, the multi-layers of the solid core, intermediate layer, or cover is configured to satisfy a requirement of the structure of the solid core, intermediate layer, or cover as a whole.

The solid core 1 of the present invention may be made from a known core material, typically, a rubber composition. In particular, polybutadiene, preferably cis-1,4-polybutadiene having at least 40% or more of a cis-structure may be used as a base rubber of the solid core 1.

A cross-linking agent, for example, a zinc salt or a magnesium salt of an unsaturated fatty acid, such as zinc methacrylate or zinc acrylate, or an ester compound such as trimethylolpropanetrimethacrylate may be added to the above rubber composition. In particular, zinc acrylate is preferably added because it has a high repulsion characteristic. The added amount of the cross-linking agent may be in a range of 10 to 35 parts by weight on the basis of 100 parts by weight of the base rubber.

A vulcanizing agent such as dicumyl peroxide, or a mixture of dicumyl peroxide and 1,1-bis(t-butylperoxy)-3, 3,5-trimethylcyclohexane may be added to the above rubber composition. The added amount of the vulcanizing agent may be in a range of 0.1 to 5 parts by weight on the basis of 100 parts by weight of the base rubber. Dicumyl peroxide is commercially available, for example, by NOF CORPORATION under the trade name of "Percumyl D".

A filler such as zinc oxide, barium sulfate, and the like may be further added to the rubber composition as needed for adjustment of the specific gravity. The added amount of these agents may be in a range of 10 to 50 parts by weight on the basis of 100 parts by weight of the base rubber. An anti-aging agent is also added.

The solid core of the present invention can be made from a material other than the above-described rubber composition insofar as it satisfies a hardness requirement of the solid core (compression deflection, difference in JIS-C hardness) to be described later. For example, the solid core may be made from a thermoplastic resin exemplified as a material for forming the intermediate layer to be described later.

The solid core can be made from the above-described rubber composition by kneading the rubber composition by using a usual kneader (for example, Banbury mixer, kneader or roll mill), and compression-molding a resultant compound by using a core mold. The solid core can be also made from a resin material by injection molding.

The solid core of the present invention is specified such that the compression deflection and the JIS-C hardness of the solid core are optimized as described below. First, the compression deflection of the solid core and a relationship between the compression deflection of the core and the compression deflection of a sphere composed the intermediate layer (to be described later) and the solid core covered therewith should be optimized. The compression deflection used in the present invention means a compression deflection when a load range of initial 98 N (10 kgf) to final 1275 N (130 kgf) is applied.

The compression deflection of the solid core of the present invention is specified to be equal to or more than 3.0 mm, preferably equal to or more than 3.3 mm. If the compression deflection of the solid core is less than 3.0 mm, since the solid core becomes excessively hard, the player's feeling of hitting the golf ball becomes rigid, and the spin property of the golf ball upon driver shot is increased to shorten the flying distance of the golf ball. Further, the upper limit of the compression deflection of the solid core may be equal to or less than 6.00 mm, preferably equal to or less than 5.0 mm. If the compression deflection of the solid core is more than 6.0 mm, since the solid core becomes excessively soft and thereby it fails to exhibit a sufficient repulsion characteristic, with a result that the flying distance of the golf ball is shortened.

The solid core of the present invention is specified such that the JIS-C hardness of the surface of the solid core is larger than that of the center of the solid core, and that the difference in JIS-C hardness between the surface and the center of the solid core is equal to or more than 5, preferably equal to or more than 8. If the difference in JIS-C hardness between the surface and the center of the solid core is less than 5, the spin property of the golf ball becomes excessively large, to shorten the flying distance of the golf ball. In addition, the upper limit of the difference in JIS-C hardness between the surface and the center of the solid core may be equal to or less than 22, preferably equal to or less than 20.

The diameter of the solid core of the present invention is not particularly limited but may be in a range of 32.0 to 38.7 mm, preferably 35.0 to 37.0 mm. The weight of the solid core may be in a range of 20 to 36 g, preferably 25 to 32 g.

The intermediate layer 2 of the present invention is a relatively soft layer which is mainly made from a thermoplastic resin and which has a high repulsion characteristic. The intermediate layer 2 is formed between the solid core 1 and the cover 3, as shown in FIG. 1.

As the thermoplastic resin for forming the intermediate layer, there may be used a thermoplastic elastomer. Specific examples of the thermoplastic elastomers may include various thermoplastic elastomers such as a polyester based elastomer, a polyamide based elastomer, a polyurethane based elastomer, an olefin based elastomer, and a styrene based elastomer. These thermoplastic resins are commercially available, for example, under the trade names "Hytrel" (sold by Du Pont-Toray Co., Ltd.), "Pelprene" (sold by Toyobo Co., Ltd.), "Pebax" (sold by Toray Industries, Inc.), "Pandex" (sold by Dainippon Ink & Chemicals, Incorporated), "Santoplane" (sold by Monsanto Company), and "Toughtec" (sold by Asahi Chemical industry Co., Ltd.).

Various kinds of additives such as an inorganic filler of a suitable amount may be added to the thermoplastic resin. As the inorganic filler, there may be used barium sulfate or titanium dioxide. The inorganic filler may be subjected to surface treatment so as to be easily diffused in the thermoplastic resin.

The intermediate layer of the present invention can be formed by a known molding process, such as an injection molding process or a compression molding process. The injection molding process involves placing a previously formed solid core in a mold for injection molding, and injecting the above-described material in the mold. The compression molding process involves forming a pair of cup halves made from the above-described material, surrounding a previously formed solid core with the cup halves, and pressing the cup halves to the solid core in the mold while heating the mold.

The Shore D hardness of the intermediate layer of the present invention is specified to be in a range of 45 to 55, preferably 47 to 53. If the Shore D hardness of the intermediate layer is less than 45, since the intermediate layer becomes excessively soft, the spin property of the golf ball upon driver shot becomes excessively large, to shorten the flying distance of the golf ball, and if it is more than 55, since the intermediate layer becomes excessively hard, the player's feeling of hitting the golf ball is degraded.

The specific gravity of the intermediate layer of the present invention is specified to be equal to or less than 1.2, preferably equal to or less than 1.17. If the specific gravity of the intermediate layer is more than 1.2, the repulsion characteristic thereof becomes insufficient, with a result that the flying distance of the golf ball is shortened. The lower limit of the specific gravity of the intermediate layer may be equal to more than 0.96, preferably equal to or more than 1.0.

According to the present invention, the gage of the intermediate layer is specified to be made as thin as 2.0 mm or less, preferably 1.7 mm or less. If the gage of the intermediate layer is more than 2.0 mm, it may fail to improve the player's feeling of hitting the golf ball and to lengthen the flying distance of the golf ball. The lower limit of the gage of the intermediate layer may be equal to or less than 0.2 mm, preferably equal to or less than 0.8 mm.

The multi-piece solid golf ball of the present invention is specified such that a ratio of the compression deflection of a sphere composed of the intermediate layer and the solid core covered therewith when a load range of initial 10 kgf to final 130 kgf is applied to the compression deflection of the solid core when a load range of initial 10 kgf to final 130 kgf is applied (compression deflection of sphere/compression deflection of solid core) is optimized, that is, set at a value being more than 0.900 and less than 0.970 [0.900<(compression deflection of sphere/compression deflection of solid core)<0.970], preferably more than 0.910 and less than 0.960 [0.910<(compression deflection of sphere/compression deflection of solid core)<0.960]. If the above ratio in compression deflection is equal to or less than 0.900, the player's feeling of hitting the golf ball upon putter shot or approach shot such as iron shot is degraded, and if it is equal to or more than 0.970, the spin property of the golf ball upon driver shot becomes excessively large, to shorten the flying distance of the golf ball.

The golf ball of the present invention includes, as shown in FIG. 1, the cover 3 as the outermost portion of the golf ball. As described above, the cover of the present invention may be of a single layer structure or a multi-layer structure having two or more layers. The multi-layer cover has at least one layer constituting the outermost layer and one or more layers formed inside the outermost layer. According to the present invention, it is defined that even in such a multi-layer cover, the plurality of layers constituting the cover satisfy a requirement of the cover as a whole, and particularly, any of the one or more layers formed inside the outermost layer is distinguished from the above-described intermediate layer.

The cover of the present invention can be formed from a known material mainly containing a thermoplastic resin. As the cover material, there may be used an ionomer resin which is commercially available, for example, under the trade name "Himilan" (sold by Du Pont-Mitsui Polychemicals Co., Ltd.), "Surlyn" (sold by Du Pont De Nemours & Company), or "Iotec" (sold by Exxon Chemical Japan Ltd.)

Various additives such as an inorganic filler of a suitable amount may be added to the cover material. As the inorganic filler, there may be used the above-described filler added to the intermediate layer.

Like the intermediate layer, the cover can be formed from the above-described material by injection molding or compression molding.

According to the present invention, the thickness of the cover is specified to be in a range of 1.6 to 2.3 mm, preferably 1.8 to 2.1 mm. If the thickness of the cover is less than 1.6 mm, the durability of the cover is degraded, tending to cause cracks, and if it is more than 2.3 mm, the player's feeling of hitting the golf ball is degraded.

The Shore D hardness of the cover is specified to be equal to or more than 60, preferably equal to or more than 62. If the Shore D hardness of the cover is less than 60, the repulsion characteristic thereof becomes insufficient, with a result that the flying performance of the golf ball is degraded. The upper limit of the Shore D hardness of the cover may be equal to or more than 68, preferably equal to or more than 65. If the Shore D hardness of the cover is more than 68, the player's feeling of hitting the golf ball may become rigid.

With respect to the multi-piece solid golf ball of the present invention having the above-described configuration, the compression deflection of the ball may be in a range of 2.5 to 3.5 mm, preferably 2.7 to 3.2 mm. The multi-piece solid golf ball of the present invention has on its surface a large number of dimples, the shapes and arrangement of which may be the same as those of dimples of a known golf ball. In addition, the multi-piece solid golf ball of the present invention may be subjected to a known surface finish treatment such as painting or stamping.

The multi-piece golf ball of the present invention can be produced with its diameter and weight specified under the golf rule, specifically, the diameter being in a range of 42.67 mm or more, and the weight being in a range of 45.93 g or less.

As described above, the multi-piece solid golf ball of the present invention is capable of giving a player a desirable soft feeling of hitting the golf ball upon putter shot or approach shot and also a desirable feeling of hitting the golf ball upon driver shot, and is capable of improving the flying performance of the golf ball.

The present invention will be more clearly understood by way of, while not limited thereto, the following examples:

EXAMPLES

A rubber compound having the formulation shown in Table 1 was introduced in a specific mold to form a solid core having a difference in JIS-C hardness shown in Table 1.

The solid core thus formed was sequentially covered with an intermediate layer and a cover by using materials shown in Table 2 in accordance with conditions shown in Table 3 to produce a golf ball having on its surface dimples with the same shapes and arrangement.

In this way, the golf ball samples in Examples 1 to 4 and Comparative Examples 1 to 8 were obtained.

Note that characters "Hytrel", "Surlyn", "Himilan", and "Pelprene" in Table 2 designate the following materials:

"Hytrel": polyester based thermoplastic elastomer by Du Pont-Toray Co., Ltd.

"Surlyn": ionomer resin by Du Pont De Nemours & Company

"Himilan": ionomer resin by Du Pont-Mitsui Polychemicals Co. Ltd.

"Pelprene": polyester based thermoplastic elastomer by Toyobo Co., Ltd.

For each of the golf ball samples, the compression deflection was measured, and the hitting performance, player's feeling, and the durability against cracks were evaluated in accordance with the following testing methods:

Compression Deflection

The compression deflection of each golf ball sample was measured as a deformation (mm) of the ball under a load of 1275 N (130 kgf) based on an initial load of 98 N (10 kgf).

Hitting Performance

Each golf ball sample was hit at a head speed of 35 m/s by a swing robot on which a driver (#W1) was mounted, and the carry, total flying distance, and spin property of the ball were measured.

The flying performance of the ball was evaluated under the following criterion:

○: good (total distance: 155 m or more)

X: poor (total distance: less than 155 m)

Player's Feeling

Each golf ball sample was hit with the driver (#W1) and putter, and the player's feeling was evaluated under the following criterion:

○: good (soft) feeling

Δ: slightly rigid

X: poor

Durability Against Cracks

Each golf ball sample was repeatedly hit at a head speed of 40 m/s by the swing robot on which the driver (#W1) was mounted, and the number of hitting of the ball until the ball was cracked was evaluated under the following criterion:

○: good durability against cracks (no crack occurs after hitting is repeated by 200 times or more)

X: poor durability against cracks (cracks occur after hitting is repeated by less than 150 times)

The results are shown in Table 3.

As is apparent from Table 3, each of the samples in Comparative Examples 1 to [4 and 6] *5* and 7 *and 8* is poor in flying performance, and the sample in Comparative Example [5] *6* is good in flying performance, and player's feeling upon each of driver shot and putter shot, but is poor in durability against cracks. On the contrary, each of the samples in Examples 1 to 4 is good in flying performance, player's feeling upon each of driver shot and putter shot, and durability against cracks. Further, the sample in each of Examples 1 to 4 is smaller in spin property than that of each of Comparative Examples 1 to *5 and 7 and* 8.

While the preferred embodiments of the present invention have been described using the specific terms, such description is for illustrative purposes only, and it is to be understood that changes and variations may be made without departing from the spirit and scope of the following claims.

TABLE 1

| | | | Example | | | | Comparative Example | | | | | | | |
|---|---|---|---|---|---|---|---|---|---|---|---|---|---|---|
| | | | 1 | 2 | 3 | 4 | 1 | 2 | 3 | 4 | 5 | 6 | 7 | 8 |
| Component for Core (parts by weight) | Polybutadiene | | 100 | 100 | 100 | 100 | 100 | 100 | 100 | 100 | 100 | 100 | 100 | 100 |
| | Zinc Acrylate | | 25 | 27.4 | 24.4 | 25 | 28.7 | 31.6 | 26.8 | 27.6 | 27.6 | 25 | 28.7 | 27.4 |
| | Peroxide (*) | | 1.2 | 1.2 | 1.2 | 1.2 | 1.2 | 1.2 | 1.2 | 1.2 | 1.2 | 1.2 | 1.2 | 1.2 |
| | Anti-aging Agent | | 0.2 | 0.2 | 0.2 | 0.2 | 0.2 | 0.2 | 0.2 | 0.2 | 0.2 | 0.2 | 0.2 | 0.2 |
| | Barium Sulfate | | 25.2 | 24.2 | 25.4 | 18.8 | 18.9 | 17.7 | 29.1 | 24.1 | 23.7 | 19.9 | 23.8 | 13.7 |
| | Zinc Oxide | | 5 | 5 | 5 | 5 | 5 | 5 | 5 | 5 | 5 | 5 | 5 | 5 |
| | Zinc Salt of Pentachlorothiophenol | | 0.2 | 0.2 | 0.2 | 0.2 | 0.1 | 0.1 | 0.2 | 0.2 | 0.2 | 0.2 | 0.2 | 0.2 |
| Vulcanizing Condition | Primary Vulcanization | Temperature (° C.) | 155 | 155 | 155 | 155 | 155 | 155 | 155 | 155 | 155 | 155 | 155 | 155 |
| | | Time (Minute) | 15 | 15 | 15 | 15 | 15 | 15 | 15 | 15 | 30 | 15 | 15 | 15 |
| | Secondary Vulcanization | Temperature (° C.) | | | | | | | | | 170 | | | |
| | | Time (Minute) | | | | | | | | | 10 | | | |
| Hardness | A: Core Surface (JIS-C) | | 73 | 78 | 71 | 74 | 79 | 82 | 77 | 78 | 71 | 73 | 79 | 78 |
| | B: Core Center (JIS-C) | | 61 | 64 | 61 | 60 | 65 | 68 | 63 | 64 | 68 | 61 | 65 | 64 |
| | A-B (JIS-C) | | 12 | 14 | 10 | 14 | 14 | 14 | 14 | 14 | 3 | 12 | 14 | 14 |

(*) mixture of Percumyl D (NOF CORPORATION) and Perhexa 3M-40 (NOF CORPORATION) at weight ratio of 1:1

TABLE 2

| | | ① | ② | ③ | ④ | ⑤ | ⑥ | ⑦ |
|---|---|---|---|---|---|---|---|---|
| Component for Intermediate Layer/Cover (parts by weight) | Himilan 1706 | 50 | 25 | | | | | |
| | Himilan 1650 | | | | | | 50 | |
| | Himilan 1557 | | | | | 50 | | |
| | Himilan 1605 | 50 | 25 | | | | | |
| | Himilan 1601 | | | | | 50 | | |
| | Surlyn 8120 | | | | | | 50 | |
| | Hytrel 4767 | | | 100 | | | | |
| | Hytrel 4047 | | | | 100 | | | |
| | Hytrel 3078 | | 50 | | | | | |
| | Pelprene P150B | | | | | | | 50 |
| | Pelprene P150M | | | | | | | 50 |
| | Titanium Dioxide | 5.6 | 0 | 0 | 0 | 5.6 | 5.6 | 0 |
| Physical Property | Specific Gravity | 0.985 | 1.020 | 1.165 | 1.33 | 0.965 | 0.985 | 1.210 |
| | Resin Hardness (Shore D) | 63 | 51 | 52 | 43 | 60 | 55 | 54 |

TABLE 3

| | | Example | | | | Comparative Example | | | | | | | |
|---|---|---|---|---|---|---|---|---|---|---|---|---|---|
| | | 1 | 2 | 3 | 4 | 1 | 2 | 3 | 4 | 5 | 6 | 7 | 8 |
| Core | Weight (g) | 28.71 | 27.55 | 27.64 | 27.82 | 27.03 | 27.03 | 28.2 | 27.55 | 27.55 | 29.54 | 26.45 | 26.24 |
| | Compression Deflection (mm) | 4.20 | 3.75 | 4.32 | 4.19 | 3.49 | 2.94 | 3.85 | 3.75 | 3.70 | 4.20 | 3.50 | 3.75 |
| Intermediate Layer | Kind | ② | ② | ② | ③ | ④ | ④ | ⑤ | ② | ③ | ② | ② | ⑦ |
| | Weight (g) | 34.97 | 34.63 | 34.65 | 35.18 | 35.15 | 35.15 | 35.15 | 34.63 | 34.65 | 37.41 | 32.75 | 34.63 |
| | Compression Deflection (mm) (*) | 4.01 | 3.47 | 3.93 | 3.95 | 3.18 | 2.05 | 3.30 | 3.47 | 3.40 | 4.00 | 3.32 | 3.39 |
| | Gage (mm) | 1.42 | 1.63 | 1.62 | 1.46 | 1.68 | 1.68 | 1.68 | 1.63 | 1.63 | 1.70 | 1.50 | 1.63 |

TABLE 3-continued

| | | Example | | | | Comparative Example | | | | | | | |
|---|---|---|---|---|---|---|---|---|---|---|---|---|---|
| | | 1 | 2 | 3 | 4 | 1 | 2 | 3 | 4 | 5 | 6 | 7 | 8 |
| Cover | Type | ① | ① | ① | ① | ① | ① | ① | ⑥ | ① | ① | ① | ① |
| | Thickness (mm) | 2.10 | 2.14 | 2.13 | 2.07 | 2.07 | 2.07 | 2.07 | 2.14 | 2.13 | 1.50 | 2.40 | 2.14 |
| Ratio of Compression Deflection | Intermediate Layer (*)/ | 0.955 | 0.925 | 0.910 | 0.943 | 0.911 | 1.003 | 0.857 | 0.925 | 0.919 | 0.952 | 0.949 | 0.904 |
| Ball | Weight (g) | 45.21 | 45.08 | 45.07 | 45.25 | 45.27 | 45.27 | 45.30 | 45.08 | 45.30 | 45.30 | 45.30 | 45.30 |
| | Outside Diameter (mm) | 42.70 | 42.70 | 42.70 | 42.70 | 42.70 | 42.70 | 42.70 | 42.70 | 42.70 | 42.70 | 42.70 | 42.70 |
| | Compression Deflection (mm) | 3.03 | 2.72 | 3.03 | 3.04 | 2.73 | 2.60 | 2.75 | 2.82 | 2.79 | 3.12 | 2.65 | 2.65 |
| Driver #W1 (HS35) | Carry (m) | 141.8 | 141.8 | 142.5 | 142.1 | 142.2 | 142.0 | 140.5 | 138.4 | 141.4 | 141.8 | 141.5 | 140.8 |
| | Total (m) | 155.7 | 156.2 | 155.1 | 155.9 | 153.6 | 152.5 | 152.1 | 149.5 | 152.9 | 155.3 | 153.8 | 153.9 |
| | Flying Performance | ○ | ○ | ○ | ○ | X | X | X | X | X | ○ | X | X |
| | Spin (rpm) | 3428 | 3562 | 2458 | 3366 | 3743 | 3798 | 3565 | 3722 | 3717 | 3479 | 3762 | 3605 |
| | Feeling | ○ | ○ | ○ | ○ | ○ | Δ | Δ | ○ | ○ | ○ | Δ | ○ |
| Putter | Feeling | ○ | ○ | ○ | ○ | ○ | ○ | X | ○ | ○ | ○ | X | ○ |
| Durability Against Cracks | | ○ | ○ | ○ | ○ | ○ | ○ | ○ | ○ | ○ | X | ○ | ○ |

(*) compression deflection of sphere composed of intermediate layer and core covered therewith

What is claimed is:

1. A multi-piece solid golf ball comprising: a solid core; at least one intermediate layer for covering said solid core; and a cover having at least one cover layer for covering said intermediate layer;

wherein said solid core has a comparison deflection of 3.0 mm or more when a load range of initial 10 kgf to final 130 kgf is applied, said intermediate layer is mainly made from a thermoplastic resin and has a Shore D hardness of 45 to 55 and a specific gravity of 1.2 or less *and less than a specific gravity of said solid core*, and said cover has a Shore D hardness of 60 or more and a thickness of 1.6 to 2.3 mm;

a ratio of the compression deflection of a sphere composed of said intermediate layer and said solid core covered therewith to the compression deflection of said solid core is more than 0.900 and less than 0.970 [*0.900*<(*compression deflection of sphere/compression deflection of solid core*)<*0.970*]; and a difference in JIS-C hardness (specified under JIS K6301-1996) between the surface and the center of said solid core is equal to or [less] *greater* than 5 [*5*≦(*surface hardness-center hardness*)].

2. A multi-piece solid golf ball according to claim 1, wherein the gage of said intermediate layer is equal to or less than 2.0 mm.

*3. A multi-piece solid golf ball according to claim 1, wherein said difference in JIS-C hardness between the surface and the center of said solid core is equal to or less than 22.*

*4. A multi-piece solid golf ball according to claim 1, wherein said ratio of the compression deflection of said sphere composed of said intermediate layer and said solid core covered therewith to the compression deflection of the solid core is more than 0.910 and less than 0.960.*

*5. A multi-piece solid golf ball comprising: a solid core; at least one intermediate layer for covering said solid core; and a cover having at least one cover layer for covering said intermediate layer;*

*wherein said solid core has a compression deflection of 3.0 mm or more when a load range of initial 10 kgf to final 130 kgf is applied, said intermediate layer is mainly made from a thermoplastic resin and has a Shore D hardness of 45 to 55 and a specific gravity of 1.2 or less and less than a specific gravity of said solid core, and said cover has a Shore D hardness of 60 or more;*

*a ratio of the compression deflection of a sphere composed of said intermediate layer and said solid core covered therewith to the compression deflection of said solid core is more than 0.900 and less than 0.970; and*

*a difference in JIS-C hardness (specified under JIS K6301-1996) between the surface and the center of said solid core is equal to or greater than 5 [5≦(surface hardness-center hardness)].*

* * * * *